United States Patent
Kim et al.

(10) Patent No.: US 9,525,284 B2
(45) Date of Patent: Dec. 20, 2016

(54) MEDIUM VOLTAGE DC COLLECTION SYSTEM WITH POWER ELECTRONICS

(71) Applicant: ABB Research Ltd, Zurich (CH)

(72) Inventors: Hongrae Kim, Cary, NC (US); Jun Li, Raleigh, NC (US); Zhenyuan Wang, Cary, NC (US); Joseph A. Carr, Cary, NC (US); Eddy C. Aeloiza, Apex, NC (US); Darren D. Tremelling, Cary, NC (US)

(73) Assignee: ABB Research Ltd, Zurich (CH)

( * ) Notice: Subject to any disclaimer, the term of this patent is extended or adjusted under 35 U.S.C. 154(b) by 567 days.

(21) Appl. No.: 14/038,842

(22) Filed: Sep. 27, 2013

(65) Prior Publication Data

US 2014/0091630 A1 Apr. 3, 2014

Related U.S. Application Data

(60) Provisional application No. 61/708,144, filed on Oct. 1, 2012.

(51) Int. Cl.
*H02J 1/00* (2006.01)
*H02J 3/00* (2006.01)
(Continued)

(52) U.S. Cl.
CPC .. *H02J 1/00* (2013.01); *H02J 3/36* (2013.01); *H02J 3/386* (2013.01); *H02M 3/3372* (2013.01);
(Continued)

(58) Field of Classification Search
USPC .......................................................... 307/82
See application file for complete search history.

(56) References Cited

U.S. PATENT DOCUMENTS 7,324,359 B2   1/2008  Schreiber ........................ 363/68
7,633,770 B2   12/2009  Datta et al. ..................... 363/35
(Continued)

FOREIGN PATENT DOCUMENTS

DE    41 03 542 A1   8/1992   .............. H02M 3/37
DE    196 20 906 A1  1/1998   ................ H02P 9/48
(Continued)

OTHER PUBLICATIONS

*A Case for Medium Voltage Direct Current (MVDC) Power for Distribution Applications*; Reed et al.; IEEE-PES Power Systems Conference and Exposition; Mar. 23, 2011—Phoenix, AZ; 21 pages of presentation slides.
(Continued)

*Primary Examiner* — Rexford Barnie
*Assistant Examiner* — Xuan Ly
(74) *Attorney, Agent, or Firm* — Taft Stettinius & Hollister LLP

(57) ABSTRACT

A power generation system includes at least one generator that generates a medium voltage direct current that has a positive DC voltage output and a negative DC voltage output. The system also provides a medium voltage DC (MVDC) cable system with a positive pole cable and a negative pole cable, wherein the positive pole cable is connected to the positive DC voltage output and the negative pole cable is connected to the negative DC voltage output. A substation is connected to the MVDC cable system and includes at least one DC/DC step-up converter to step-up the medium voltage direct current to a high voltage direct current.

10 Claims, 3 Drawing Sheets

(51) Int. Cl.
H02J 3/36 (2006.01)
H02J 3/38 (2006.01)
H02M 3/337 (2006.01)
H02M 7/483 (2007.01)

(52) U.S. Cl.
CPC ..... *H02M 2007/4835* (2013.01); *Y02E 10/763* (2013.01); *Y02E 60/60* (2013.01); *Y10T 307/707* (2015.04)

(56) References Cited

U.S. PATENT DOCUMENTS

| | | | |
|---|---|---|---|
| 7,863,766 B2 | 1/2011 | Abolhassani et al. | 290/44 |
| 7,880,419 B2 | 2/2011 | Sihler et al. | 318/504 |
| 7,969,755 B2 | 6/2011 | Davies et al. | 363/35 |
| 8,018,083 B2 | 9/2011 | Larsen et al. | 290/44 |
| 8,044,537 B2 | 10/2011 | Asplund et al. | 307/82 |
| 8,405,251 B2 | 3/2013 | Barton et al. | 307/84 |
| 8,680,702 B2 * | 3/2014 | Castelli Dezza | H02P 9/305 290/44 |
| 8,692,408 B2 | 4/2014 | Zhang et al. | 307/12 |
| 2006/0097519 A1 | 5/2006 | Steinke | 290/44 |
| 2008/0252142 A1 | 10/2008 | Davies et al. | 307/42 |
| 2009/0146603 A1 | 6/2009 | Sihler et al. | 318/812 |
| 2009/0212568 A1 | 8/2009 | Maibach et al. | 290/44 |
| 2009/0273956 A1 | 11/2009 | Castelli Dezza et al. | 363/67 |
| 2010/0133816 A1 | 6/2010 | Abolhassani et al. | 290/44 |
| 2010/0292852 A1 | 11/2010 | Gertmar et al. | 700/287 |
| 2011/0049994 A1 | 3/2011 | Hiller et al. | 307/82 |
| 2012/0101643 A1 | 4/2012 | Kirchner et al. | 700/287 |
| 2012/0116841 A1 | 5/2012 | Bippert et al. | 705/7.31 |
| 2012/0136494 A1 | 5/2012 | Kirchner et al. | 700/287 |
| 2012/0267955 A1 | 10/2012 | Zhan et al. | 307/31 |
| 2013/0197704 A1 | 8/2013 | Pan et al. | 700/287 |
| 2013/0200714 A1 | 8/2013 | Pan et al. | 307/82 |

FOREIGN PATENT DOCUMENTS

| | | | | |
|---|---|---|---|---|
| EP | 2 104 216 A1 | | 9/2009 | H02M 3/337 |
| EP | 2 341 594 A1 | | 7/2011 | H02J 3/36 |
| GB | EP2341594 | * | 7/2011 | |
| WO | WO 00/74198 A1 | | 12/2000 | H02J 3/36 |
| WO | WO 01/52379 A2 | | 7/2001 | H02J 3/36 |
| WO | WO 2009/135728 A3 | | 11/2009 | F03D 9/00 |
| WO | WO2011/033308 | * | 3/2011 | |
| WO | WO 2011/033308 A2 | | 3/2011 | H02J 3/36 |

OTHER PUBLICATIONS

*Wind Farm Configuration and Energy Efficiency Studies—Series DC versus AC Layouts*;Lundberg; PhD Thesis; Chalmers University of Technology, Sweden, 2006.
*DC Connection for Large Scale Wind Farms*, Pan et al.; 9$^{th}$ International Workshop on Large-Scale Integration of Wind Power into Power Systems; Oct. 2010.
*Overview of Multi-MW Wind Turbines and Wind Parks*, Liserre et al.; IEEE Transaction on Industrial Electronics, 2011.
*Medium Voltage Power Conversion Technology for Efficient Windpark Power Collection Grids*, Steimer et al; IEEE International Symposium on Power Electronics for Distributed Generation System; Jun. 2010.
*DC/DC Conversion Systems Consisting of Multiple Converter Modules: Stability, Control, and Experimental Verifications*, Chen et al; IEEE Transactions on Power Electronics; vol. 24, No. 6; Jun. 2009.
*Key Components for Future Offshore DC Grids*; Meyer; Institute for Power Electronics and Electrical Drives; RWTH Aachen University; Sep. 2007; ISBN: 978-3-8322-6571-7.
*A Review of Power Converter Topologies for Wind Generators*, Baroudi et al.; Dept. of Electrical and Computer Engineering, University of Alberta, CA; IEEE, 2005.

*Modeling and Control of Squirrel Cage Induction Generator with Full Power Converter applied to windmils*; Garcia et al.; Oulun Yliopisto; University of Oulu; Nov. 2009.
*Current Control on a Superconducting High Voltage DC Mesh*; Johnson; University of Wisconsin-Madison; May 1989.
*Control method and snubber selection for a 5 MW wind turbine single active bridge DC/DC converter*; Lena Max et al.; Chalmers University of Technology; Sweden, Sep. 2-5, 2007.
*Design and Control of a DC Collection Grid for a Wind Farm*; Lena Max; Chalmers University of Technology; Sweden, 2009.
*Energy Evaluation for DC/DC Converters in DC-Based Wind Farms*; Lena Max; Chalmers University of Technology; Sweden, 2007.
*High Voltage Bi-Directional DC-DC-Converter for Advanced Electric locomotives*; Lopatkin et al.; Power Electronics and Applications; EPE 2009; 13$^{th}$ European Conference; Sep. 8-10, 2009.
*Evaluation of wind farm layouts*; Lundberg; Department of Electric Power Engineering; Chalmers University of Technology; Sweden, 2006.
*Configuration study of large wind parks*, Lundberg; Department of Electric Power Engineering; Chalmers University of Technology; Sweden, 2003.
*A DC Bus system for connecting offshore wind turbines with the utility system*, Macken et al.; Katholeike Universiteit Lueven, Dept of Electrical Engineering (ESAT); Belgium; 2001.
*Benchmark of Annual Energy Production for Different Wind Farm Topologies*; Meier et al.; Royal Institute of Technology; Electrical Machines and Power Electronics; Stockholm, Sweden; IEEE; 2005.
*New topology for more efficient AC/DC converters for future offshore wind farms*; Meier et al; Royal Institute of Technology; Stockholm, Sweden, Jun. 2004.
*New Voltage Source Converter Topology for HVDC Grid Connection of Offshore Wind farms*; Meier et al.; Proceedings of EPE—PEMC; Sep. 2004; Riga, Latvia.
*A power conversion system for offshore wind parks*; Mogstad et al.; Norwegian University of Science and Technology, Department of Electric Power Engineering; Trondheim, Norway; IEEE 2008.
*Power Collection and Integration on the Electric Grid from Offshore Wind Parks*; Mogstad et al.; NORPIE; Jun. 9-11, 2008.
*A Methodology for Developing 'Chainlink' Converters*; Oates; areva t&d pes, Stafford, UK, Sep. 8-10, 2009.
*A New Architecture for Offshore Wind Farms*; Prasai et al.; IEEE Transactions on Power Electronics; vol. 23, No. 3; May 2008.
*A Regulated Dc-Dc Voltage Source Converter Using a High Fregoeng Link*; Ranganathan et al.; IEEE Transactions on Industry Applications; vol. IA-18, No. 3; May/Jun. 1982.
*The Reverse Blocking IGBT for Matrix Converter With Ultra-Thin Wafer Technology*; Takei et al.; Fuji Electronic Corporate Research and Development, Ltd.; Japan; Apr. 2003.
*High-Voltage DC-DC Converter for New-Generation Electric Locomotives*; Zinovev et al.; Russian Electrical Engineering; vol. 80, No. 12; pp. 685-690; 2009.
*Multicell Interleaved Flyback Using Intercell Transformers*; Forest et al.; IEEE Transactions on Power Electronics; IEEE Service Center; Piscataway, NJ, USA; vol. 22, No. 5; Sep. 1, 2007.
International Search Report mailed Apr. 15, 2014 in corresponding application No. PCT/US2013/062089.
Written Opinion mailed Apr. 15, 2014 in corresponding application No. PCT/US2013/062089.
International Search Report mailed Apr. 25, 2014 in corresponding application No. PCT/US2013/024255.
Written Opinion mailed Apr. 25, 2014 in corresponding application No. PCT/US2013/024255.
International Search Report mailed May 23, 2014 in corresponding application No. PCT/US2013/024254.
Written Opinion mailed May 23, 2014 in corresponding application No. PCT/US2013/024254.

* cited by examiner

MEDIUM VOLTAGE DC COLLECTION SYSTEM WITH POWER ELECTRONICS

CROSS-REFERENCE TO RELATED APPLICATIONS

This application claims priority of U.S. Provisional Application Ser. No. 61/708,144 filed Oct. 1, 2012, which is incorporated herein by reference.

TECHNICAL FIELD

Generally, the present invention relates to wind power collection and an associated grid integration scheme for a large-scale offshore wind power plant. In particular, the present invention is directed to a wind power conversion-collection system architecture that facilitates realization of a high range, medium voltage DC collection system. Specifically, the present invention is directed to a multi-phase wind turbine generator and power cell based modular converters with middle frequency or high frequency transformers to enable medium voltage direct current electrical systems in the range of 1 kV to 50 kV or higher, for offshore wind power plants.

BACKGROUND ART

A typical large-scale offshore wind power plant (sometimes referred to as a wind farm) architecture consists of wind turbines, a medium voltage collection system, an offshore substation, a high voltage transmission system and an onshore substation to interface with the main power grid. Medium voltage AC collection systems, typically about 33 kV, are currently used, irrelevant of the type of wind turbine technologies utilized by the wind farm. The choice of transmission system is mainly determined by the distance from the offshore wind power plant to the onshore grid connection point. For close-to-shore wind power plants, high voltage AC (HVAC) transmission systems are used. For offshore wind power plants with long distances to shore, voltage source converter based high voltage DC (VSC-HVDC) systems have proven technically advantageous and cost-effective over conventional HVAC solutions.

In view of system opportunities from wind turbines to the grid connection point, it is possible to improve overall system efficiency and performance by adopting medium voltage DC (MVDC) collection system within the wind power plant. The prerequisite for adopting a MVDC collection system for offshore wind power plant is that medium voltage conversion equipment is used at the generator level, thus allowing elimination of the wind turbine's step-up transformers. Double-fed induction generators have been the prevailing wind generator technology and have dominated the market. However, such technology has become less preferred than other emerging generator technologies such as permanent magnet synchronous generators with full power back-to-back converters due to the fact that the emerging technologies provide better reliability and performance.

As the offshore wind energy infrastructure continues to grow, the electrical system in an offshore wind power plant and its connection to the main power grid pose technical challenges with regard to overall system efficiency and performance. The internal wind power collection system of future large offshore wind power plants may be represented by the following electrical characteristics: 400 MW and higher total capacity; increased power of single wind turbines in the range of 5-10 MW; longer distances between turbines, 1,000-1,500 m; maximum distance between two turbines, 10-30 km; and five to eight turbines or 30-40 MW power level, per feeder. As such, there are several technical challenges for medium voltage collection grids. One problem with a typical 33 kV MVAC collection system is low efficiency resulting from higher power loss of wind turbine transformers and AC cables. Increasing collection system voltage from 33 kV to 72 kV can significantly improve efficiency of the collection system. However, this solution may be restricted by the increased dimension of electrical equipment inside the wind turbine tower, such as wind turbine transformers and switchgear. There are also increased demands for high power density and less complexity in wind turbines and offshore platforms.

MVDC collection systems present a promising solution to overcome the aforementioned problems. The main challenge for MVDC solutions for large offshore wind farms is the need for a high range medium voltage electrical system, up to 40-50 kV or higher, without DC/DC power conversion at the wind turbines. Some solutions provide for configuration of a multi-phase wind turbine generator with cascaded AC/DC converters to obtain a higher output voltage. It is known that power cell based modular converters are advantageous for converter-fed generators with reduced stress on generator winding insulations. Therefore, there is a need for a wind power generation and conversion system with multi-phase wind turbine generator and power cell based modular converters to realize an efficient and reliable MVDC electrical system, in the range of 20 kV to 50 kV or higher, for offshore wind power plants. Additionally, there is a need for a wind farm electrical farm architecture with a high range MVDC collection system and high voltage transmission system. In particular, for HVAC-connected offshore wind farms there is a further need for collection system schemes which provide power electronics with middle frequency or high frequency transformers incorporated into DC/DC rectifiers with power cell based modular converter technology.

SUMMARY OF THE INVENTION

In light of the foregoing, it is a first aspect of the present invention to provide a medium voltage DC collection system with power electronics.

Another aspect of the present invention is to provide a power generation system, comprising at least one generator that generates a medium voltage direct current that has a positive DC voltage output and a negative DC voltage output, a medium voltage DC (MVDC) cable system comprising a positive pole cable and a negative pole cable, wherein the positive pole cable is connected to the at least one positive DC voltage output and the negative pole cable is connected to the at last one negative DC voltage output, and a substation connected to the MVDC cable system, the substation comprising at least one DC/DC step-up converter to step-up the medium voltage direct current to a high voltage direct current.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
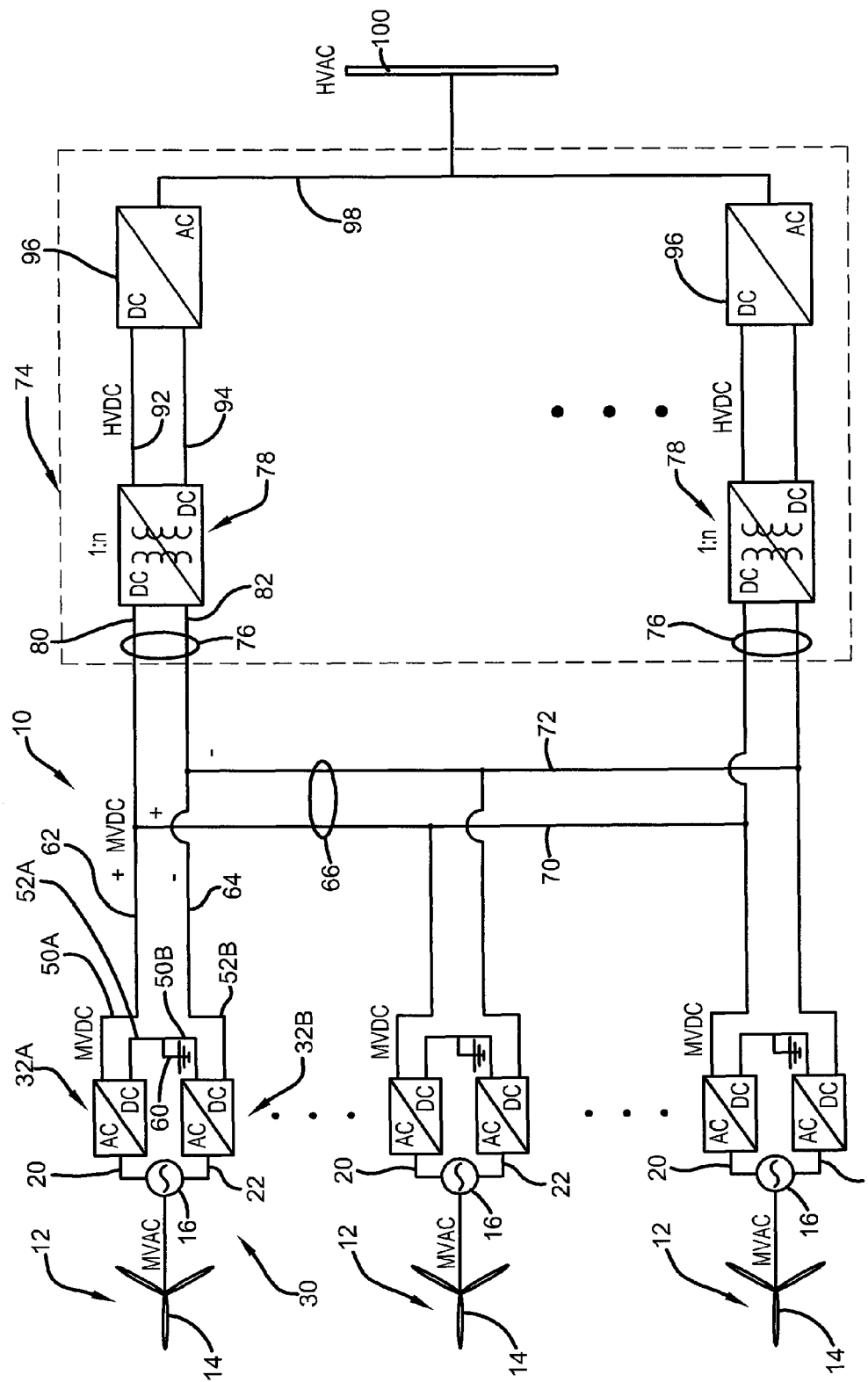
FIG. 1 is a schematic diagram of a wind power generation system and a medium voltage DC collection system with power electronics made in accordance with the concepts of the present invention.

Referring now to the drawings, and in particular to FIG. 1, it can be seen that a power generation and collection system according to the present invention is designated generally by the numeral 10. Generally, the system 10 supplies power to a power grid for distribution to electric utility customers. Although the system 10 described herein is envisioned for use with an offshore wind power system, skilled artisans will appreciate that it can also be used for an onshore wind power facility, or for other power generation systems wherein individual generators are utilized to accumulate power for transfer to an electrical grid. For example, the systems disclosed herein could be incorporated into tidal energy sources, solar facilities and the like.

The system 10 incorporates wind turbine generators designated generally by the numeral 12. It is envisioned that any number of wind turbine generators could be utilized with the system 10. Each wind turbine generator 12 includes a wind turbine 14 and a multi-phase generator 16. In particular, the generator 16 is configured as a six-phase generator that utilizes dual three-phase stator windings. In some embodiments there may be more than two stator windings and the following connections are adjusted accordingly. In any event, the neutral points of the two 3-phase windings are not connected. Moreover, each set of stator windings includes three winding elements that are arranged to minimize the voltage potential between any adjacent winding elements. Accordingly, one three-phase winding provides an output 20 while the other three-phase winding provides an output 22. Each of these outputs 20 and 22 are provided to a rectifier pair designated generally by the numeral 30. In particular, each output is connected to a corresponding rectifier in the rectifier pair 30. Each rectifier pair 30 includes an active rectifier 32A and an active rectifier 32B, wherein each rectifier takes alternating current input from a respective winding (20,22) and generates a direct current output.

Each rectifier 32 utilizes power cell based modular converter topology which provides an almost sinusoidal line-line voltage. As a result, winding insulation based on rated machine voltage is sufficient and the dv/dt filter requirement is minimized. This means that a six-phase generator is provided with a rated voltage of 13.8 kV and the DC output voltage from two cascaded rectifiers can reach above 40 kV. Of course, other embodiments could be configured where the generators 16 generate different values and the rectifiers generate different DC output voltage values. For example, by using a 25 kV generator, a six-phase generator can be provided with a rated voltage of 25 kV and the DC output voltage from two cascaded rectifiers can reach above 70 kV. In another embodiment, by using a 33 kV generator, a six-phase generator is provided with a rated voltage of 33 kV and the DC output voltage from two cascaded rectifiers can reach above 93 kV.

Figure 2:
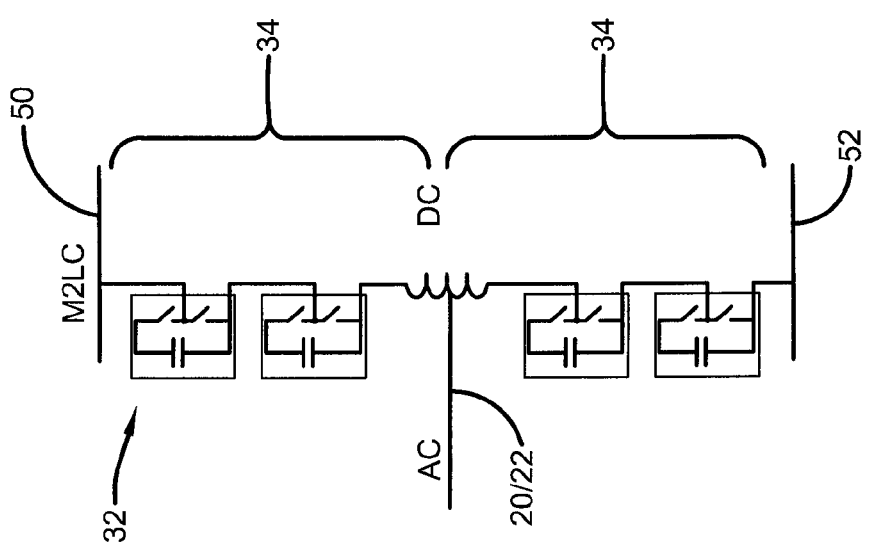
FIG. 2 is a schematic diagram of a rectifier utilized by the wind power generation system and the medium voltage DC collection system with power electronics made in accordance with the concepts of the present invention.

The rectifier 32, as best seen in FIG. 2, receives the three-phase signal in distribution circuits 34 that are based on power cell based modular converters which may also be referred to as a modular multi-level converter. In one embodiment, the circuit 34 comprises semiconductor switches configured with associated diodes and capacitors to collectively output a positive DC output 50 and a negative DC output 52. Skilled artisans will appreciate that other embodiments may use other types of AC to DC converters for the rectifier 32.

The active rectifier 32A provides for a positive DC output 50A and a negative DC output 52A. In a corresponding manner, the active rectifier 32B provides for a positive DC output 50B and a negative output 52B. The positive output 50A of the rectifier 32A is connected to a positive pole cable 62. The negative output 52B of the active rectifier 32B is connected to a negative pole cable 64. The negative output 52A of the rectifier 32A and the positive output 50B of the rectifier 32B are connected together and grounded at node 60.

The generated powers from the wind turbine generators are collected by a medium voltage direct current (MVDC) cable system 66, which along with the cables 62 or 64 may or may not be submerged, comprising a positive bus bar 70 and a negative bus bar 72. As such, the positive pole cables 62 are connected to the positive bus bar 70 and the negative bus bar 72 is connected to the negative pole cables 64. In summary, the generators 12, which comprise the wind turbine 14, the multi-phase generator 16 and a rectifier pair 30, generate a positive and a negative DC voltage output. Any number of generators 12 may be connected to the MVDC cable system 66. In most embodiments, the voltage values on the cable system can range anywhere between 1 kV DC to 50 kV DC.

A substation, which is designated generally by the numeral 74 and which may be located off-shore or on-shore, is connected to the MVDC cable system 66. The substation 74 may provide any number of feeder cables 76 to a like number of step-up DC/DC converters 78. The feeder cables include a positive feed cable 80 connected to the positive bus bar 70 and a negative feed cable 82 connected to the negative bus bar 72.

Figure 3:
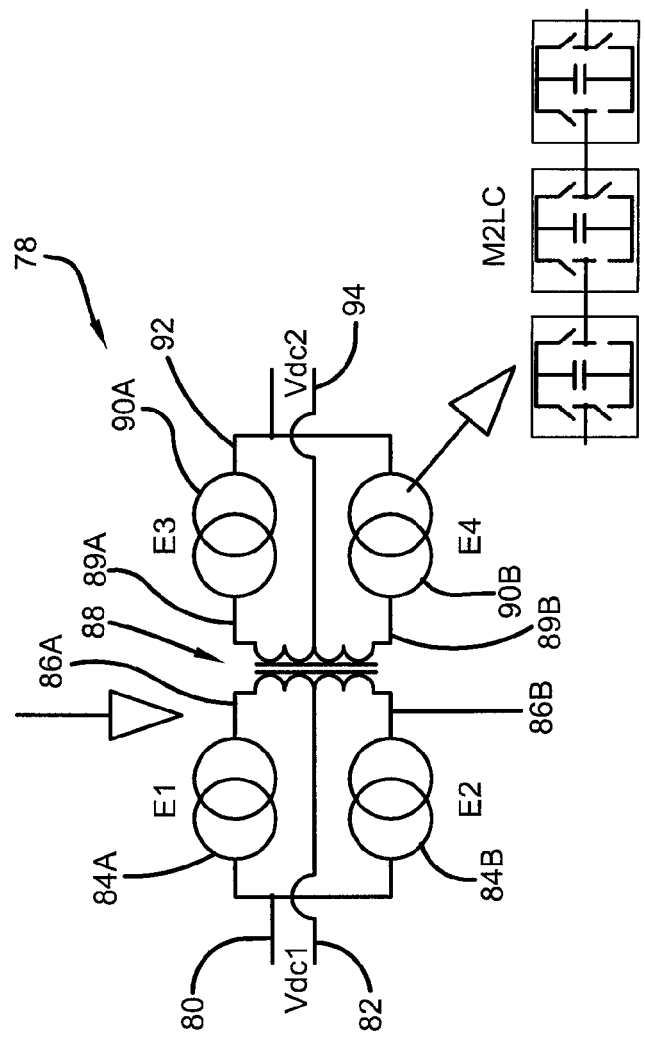
FIG. 3 is a schematic diagram of a DC/DC converter used in the medium voltage DC collection system according to the concepts of the present invention.

Referring now to FIG. 3, it can be seen that the DC/DC step-up converter 78 comprises a pair of DC/AC converters 84A and 84B. Each converter 84 is based upon a modular multi-level converter utilizing power cell based converter topology. These converters are similar to those used in the rectifiers 32. In any event, the positive feed cable 80 provides a positive medium voltage direct current input to each converter 84. As such, each converter 84 generates a medium voltage alternating current output 86 that is fed into a 1:n transformer 88. The transformer 88 also receives a negative medium voltage direct current input from the negative feed cable 82. Skilled artisans will appreciate that the transformer 88 is either a medium frequency or high frequency transformer that allows for conversion of a DC input signal (80,82) to respective AC output signals 89A and 89B at a higher voltage value, depending upon the number of turns "n" provided by the transformer. The transformer 88 then provides positive voltage output to AC/DC converters 90A and 90B which are also based on modular multi-level converter technology. The outputs of the converters 90A and 90B provide direct current outputs that are connected to each other so as to provide for positive voltage line output 92. The transformer 88 generates a negative voltage line output 94. As a result of the DC/DC step-up converter 78 configuration, the input DC voltage is stepped up the desired amount. In the embodiments provided, the voltage value generated by the converter 78 is greater than 40 kV. In other embodiments, such as for 400 MW installations, the voltage values generated by the converter can be in the range of around 360 kV. Both of the outputs 92 and 94 are transmitted to and received by a DC/AC converter 96, wherein each converter 78 is associated with and linked to a corresponding DC/AC converter 96. The DC/AC converter 96 operates in an inverse manner of the AC/DC converter 32 so as to provide a high voltage AC output 98. The respective outputs 98 of the converters 96 are then collected together and connected to a high voltage AC transmission cable 100 for delivery to an on-shore facility for further distribution.

From the foregoing it can be seen that the medium voltage DC output generated by the turbine generators 12 and the associated rectifiers 32 are converted into a high voltage DC output at a transmission terminal platform using modular multi-level controller topology. In other words, DC/DC converter technology with a medium frequency or high frequency transformer is utilized. Due to the performance characteristics of the modular multi-level converter based DC/DC technology, losses and insulation requirements of the transformers are minimized. The high voltage DC is converted into high voltage AC at the same transmission terminal platform or substation 74 using the modular multi-level converter technology based on the DC/AC converter. In the embodiment shown, a 50/60 hz HV transformer configuration is replaced with a power electronic system that is a combination modulator multi-level based DC/DC converter technology with a medium frequency or high frequency transformer and modular multi-level based high voltage DC/AC converters.

Figure 4:
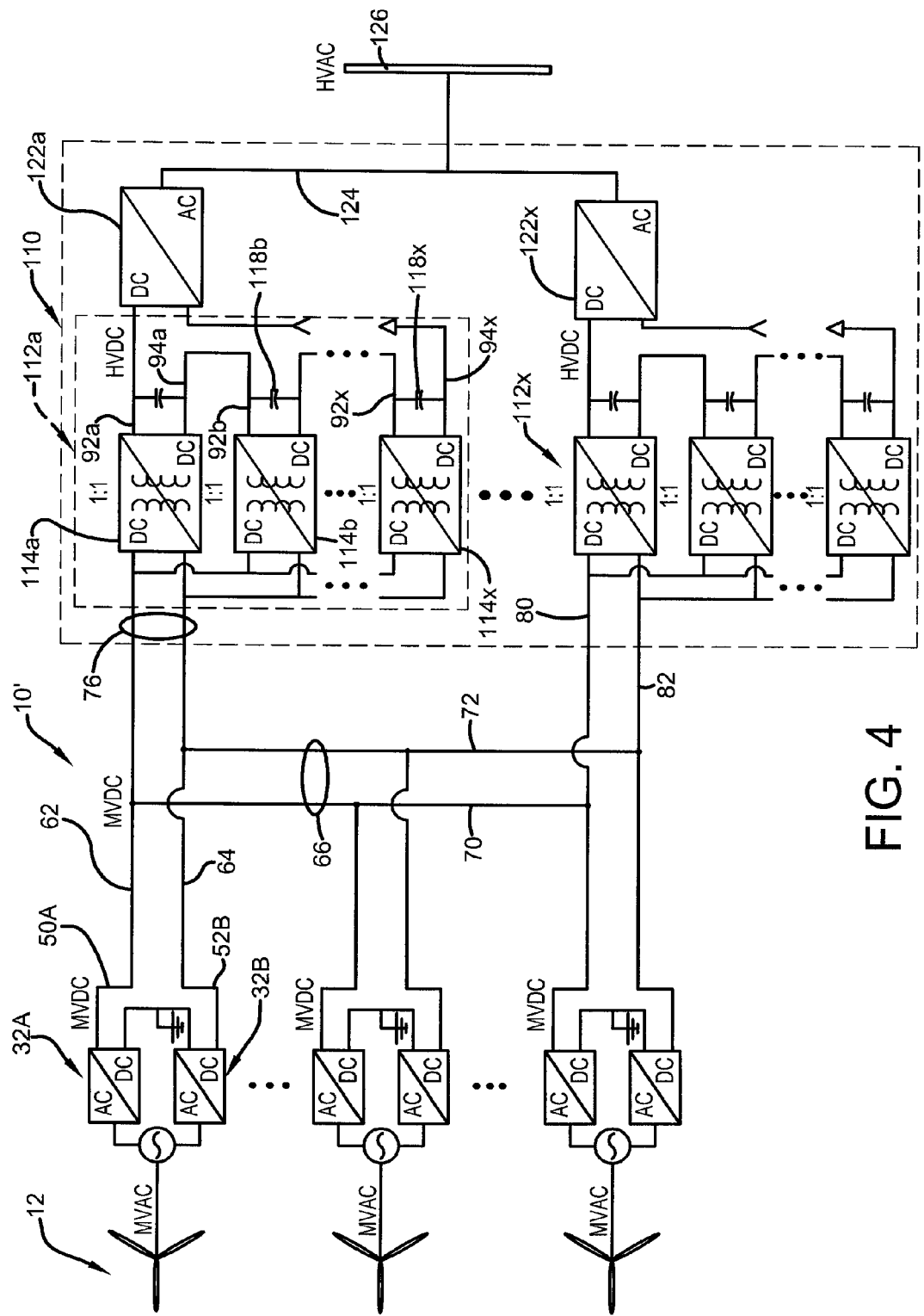
FIG. 4 is an alternative embodiment of a wind power generation system and a medium voltage DC collection system with power electronics made in accordance with the concepts of the present invention.

Referring now to FIG. 4, it can be seen that an alternative configuration power system is designated generally by the numeral 10'. Many of the components are the same, such as the turbine generators 12, the rectifier pairs 30, and the MVDC cable system 66 as in the embodiment shown in FIG. 1. The embodiment shown in FIG. 4 is distinguishable in that a substation 110 is employed which, as will become apparent, provides for serial output connections of DC/DC converters to accomplish substantially the same result as the first embodiment.

The substation 110 comprises a plurality of step-up circuits 112. Each step-up circuit 112 is associated with corresponding feeder cables that are connected to the cable system 66. Each pair of positive and negative feeder cables 76 are provided to the step-up circuit wherein any number of step-up circuits 112a-x may be provided. Each circuit 112 provides for a DC/DC converter 114. The converter 114 is similar to the converter 78 shown in FIG. 3 but instead of providing a step-up provides a 1:1 transformer ratio. Moreover, the output of the converters 114 are serially connected to generate the desired high voltage direct current value. To accomplish this, a negative output of converter 114a is connected to a positive output of an adjacent converter 114b and so on. In other words, the negative output from one converter is connected to the positive output of an adjacent converter. The only exceptions, as will be explained, are for the positive output of the first converter in the series and the negative output of the last converter in the series. A capacitor 118 is connected between the outputs 92 and 94 for each of the converters 114.

A DC/AC step-up converter is connected to the step-up circuit 112. In particular, the DC positive output 92a from the first converter in the series and the negative DC output 94x from the last converter in the series are provided as inputs to the converter 122a. The converter 122 operates in the same manner as converter 96 wherein the output from the converter 122 is in the form of high voltage AC output 124. The collective outputs 124 are then connected to a high voltage AC transmission system 126 for delivery to end customers.

In instances where the medium frequency or high frequency high power voltage transformer technology is difficult to realize, the high voltage transformer of the first embodiment can be replaced with medium frequency high frequency medium power medium voltage transformers as shown in the present embodiment. The output voltages of the converters 114 are connected in series to create a high voltage DC for delivery to multi-level modular based high voltage DC/AC converters 122.

Based on the foregoing, the advantages of the present invention are readily apparent. The main advantage is that a better solution for high range medium voltage DC collection grids for large off-shore wind farms can be realized with medium voltage power converter technology so that the cost of energy of an off-shore wind farm may be reduced. In the embodiments disclosed, a 50/60 hz HV transformer is replaced by a power electronic system in combination with modular multi-level based DC/DC converter technology with a medium frequency or high frequency transformer and modular multi-level technology based high voltage DC/AC converters. These embodiments enable improvement of wind power plant controllability and performance under myriad operating conditions.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A power generation system, comprising:
at least one generator that generates a medium voltage direct current that has a positive DC voltage output and a negative DC voltage output;
each said at least one generator comprising a multi-phase generator associated with a pair of AC/DC rectifiers, each said AC/DC rectifier having a positive DC output and a negative DC output, wherein said negative output from a first AC/DC rectifier is connected to said positive output from a second AC/DC rectifier said positive output from said first AC/DC rectifier defining said positive DC voltage output and said negative output from said second AC/DC rectifier defining said negative DC voltage output;
a medium voltage DC (MVDC) cable system comprising:
a positive pole cable and a negative pole cable, wherein said positive pole cable is connected to each said positive DC voltage output and said negative pole cable is connected to each said negative DC voltage output;
a positive bus bar connected to all said positive pole cables;
a negative bus bar connected to all said negative pole cables; and
a substation is connected to said MVDC cable system, said substation comprising multiple DC/DC step-up converters, said substation providing a plurality of feeder cables, each of which includes a positive feed cable connected to said positive bus bar and a negative feed cable connected to said negative bus bar, said plurality of feeder cables connected to a like number of said DC/DC step-up converters to step-up said medium voltage direct current to a high voltage direct current.

2. The system according to claim 1, wherein said substation further includes a DC/AC converter connected to each said DC/DC step up converter to convert said high voltage direct current to a high voltage alternating current.

3. The system according to claim 1, wherein each said DC/DC step-up converter comprises:
  a substation DC/AC converter connected to said positive and negative bus bars and generating a converter output;
  a transformer receiving said converter output to generate stepped-up voltage AC output signals; and
  a substation AC/DC converter receiving said stepped-up voltage AC output signals to generate said high voltage direct current.

4. The system according to claim 3, wherein each said DC/DC step-up converter incorporates a transformer connected to said positive and negative fees cables, each said DC/DC step-up converter stepping up said medium voltage direct current to a high voltage direct current.

5. The system according to claim 4, wherein each said DC/DC step-up converter comprises:
  a pair of substation DC/AC converters, each connected to said positive feed cable, each said substation DC/AC converter generating an AC voltage output;
  said transformer having a first side connected to said negative feed cable and receiving said AC voltage outputs; and
  a pair of substation AC/DC converters connected to a second side of said transformer, each output of said substation AC/DC converter connected to each other as a positive high voltage direct current, and a negative high voltage direct current connected to said second side of said transformer.

6. The system according to claim 1, said substation further comprising:
  at least one step-up circuit comprising:
    at least two DC/DC step-up converters that have outputs that are serially connected to one another and generating a high voltage direct current wherein said DC/AC converter is connected to said at least two DC/DC converters.

7. The system according to claim 6, wherein each said DC/DC step-up converter has a positive DC output and a negative DC output, wherein said positive DC output from a first said DC/DC step-up converter is connected to a positive input of said DC/AC converter, wherein said negative DC output from a last said DC/DC step-up converter is connected to a negative input of said DC/AC converter, and wherein each of said other negative outputs of said DC/DC step-up converters are connected to a positive output of an adjacent said DC/DC step-up converter.

8. The system according to claim 7, wherein each said DC/DC step-up converter comprises:
  a pair of substation DC/AC converters, each connected to said positive pole cable, each said substation DC/AC converter generating an AC voltage output;
  a transformer, wherein a first side of said transformer is connected to said negative pole cable and receiving said AC voltage outputs; and
  a pair of substation AC/DC converters connected to a second side of said transformer, each output of said substation AC/DC converter connected to each other to generate a positive high voltage direct current, and said second side of said transformer generating a negative high voltage direct current.

9. The system according to claim 8, wherein all of said step-up circuits generate a substantially same value of said high voltage direct current.

10. The system according to claim 9, wherein said transformer has a 1:1 step-up value.

\* \* \* \* \*